(12) United States Patent
Saeki

(10) Patent No.: US 9,749,890 B2
(45) Date of Patent: Aug. 29, 2017

(54) WIRELESS COMMUNICATION SYSTEM, WIRELESS COMMUNICATION METHOD, BASE STATION, MOBILE TERMINAL, METHOD FOR CONTROLLING BASE STATION, METHOD FOR CONTROLLING MOBILE TERMINAL, AND CONTROL PROGRAM FOR BASE STATION OR MOBILE TERMINAL

(75) Inventor: Tomoyuki Saeki, Tokyo (JP)

(73) Assignee: NEC Corporation, Tokyo (JP)

( * ) Notice: Subject to any disclaimer, the term of this patent is extended or adjusted under 35 U.S.C. 154(b) by 58 days.

(21) Appl. No.: 14/235,004

(22) PCT Filed: Jul. 20, 2012

(86) PCT No.: PCT/JP2012/069061
§ 371 (c)(1),
(2), (4) Date: Jan. 24, 2014

(87) PCT Pub. No.: WO2013/021833
PCT Pub. Date: Feb. 14, 2013

(65) Prior Publication Data
US 2014/0160974 A1    Jun. 12, 2014

(30) Foreign Application Priority Data

Aug. 10, 2011    (JP) ................................ 2011-174572

(51) Int. Cl.
*H04W 24/10*    (2009.01)
*H04W 48/16*    (2009.01)

(52) U.S. Cl.
CPC ............ *H04W 24/10* (2013.01); *H04W 48/16* (2013.01)

(58) Field of Classification Search
None
See application file for complete search history.

(56) References Cited

U.S. PATENT DOCUMENTS 5,953,665 A * 9/1999 Mattila ................. H04W 48/16
370/329
2004/0203769 A1* 10/2004 Sakanaba .................. 455/435.1
(Continued)

FOREIGN PATENT DOCUMENTS

CN    1434595 A    8/2003
CN    101925086 A    12/2010
(Continued)

OTHER PUBLICATIONS

PCT/ISA/237 Written Opinion (English Translation).
(Continued)

*Primary Examiner* — Tejis Daya
(74) *Attorney, Agent, or Firm* — McGinn IP Law Group, PLLC

(57) ABSTRACT

A mobile terminal measures surrounding cell information on the basis of a direction from a base station and selects only cell information on an unknown cell detected from the surrounding cell information and notifies the base station of the cell information on the unknown cell when information on surrounding cells is acquired by the base station. A wireless communication system includes the base station and the mobile terminal The base station includes a cell information acquisition unit for acquiring cell information including cell quality information and cell identification information on surrounding cells located around the base station, and a transmission unit for transmitting, to the mobile terminal, known cell information and acquisition direction for cell information on unknown cells that do not have cell information corresponding to the known cell information.

4 Claims, 11 Drawing Sheets

(56) References Cited

U.S. PATENT DOCUMENTS

Figure 1:
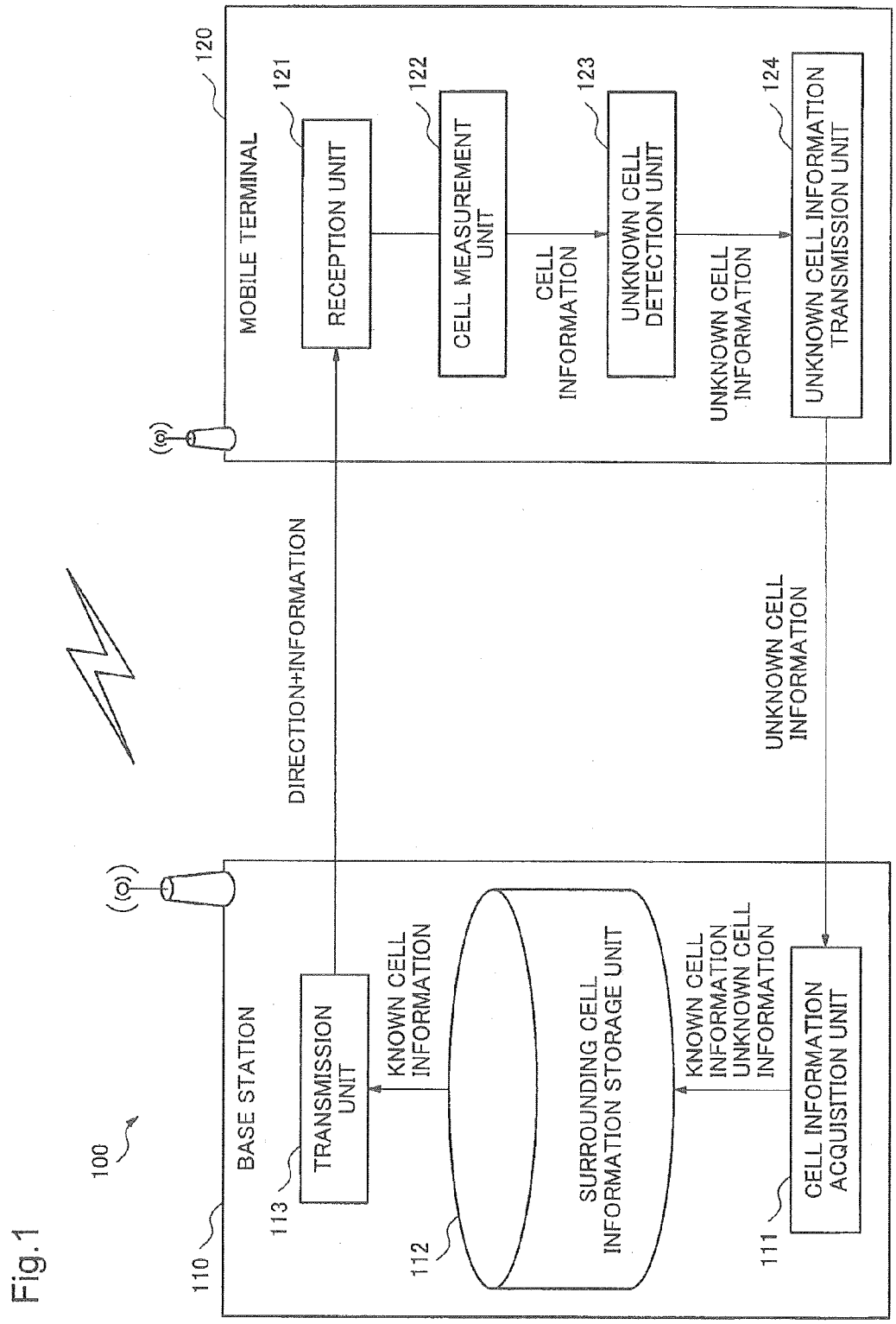

| | | | |
|---|---|---|---|
| 2005/0266845 A1* | 12/2005 | Aerrabotu et al. | 455/436 |
| 2006/0172759 A1* | 8/2006 | Ishihara | 455/525 |
| 2007/0135140 A1* | 6/2007 | Tervo | 455/456.6 |
| 2009/0117897 A1* | 5/2009 | Israelsson et al. | 455/434 |
| 2009/0270079 A1* | 10/2009 | Han et al. | 455/414.1 |
| 2010/0177683 A1* | 7/2010 | Lindoff et al. | 370/328 |
| 2010/0216455 A1* | 8/2010 | Kazmi | 455/424 |
| 2012/0178451 A1* | 7/2012 | Kubota | H04W 8/00 455/436 |
| 2012/0275315 A1* | 11/2012 | Schlangen et al. | 370/242 |
| 2012/0314604 A1* | 12/2012 | Siomina et al. | 370/252 |
| 2013/0003695 A1* | 1/2013 | Nylander et al. | 370/331 |

FOREIGN PATENT DOCUMENTS

| | | | | |
|---|---|---|---|---|
| EP | 2 190 247 A2 | 5/2010 | | |
| EP | 2224770 A1 * | 9/2010 | | H04W 36/0061 |
| JP | 2007-110478 A | 4/2007 | | |
| JP | 2008-219645 A | 9/2008 | | |
| WO | WO 2008/095542 A1 | 8/2008 | | |
| WO | WO 2008/132163 A1 | 11/2008 | | |
| WO | WO 2011/061990 A1 | 5/2011 | | |
| WO | WO 2011/091990 A1 | 8/2011 | | |

OTHER PUBLICATIONS

Extended European Search Report dated May 7, 2015.
Japanese Office Action dated May 7, 2015 with a partial English translation thereof.
Chinese Office Action dated Aug. 31, 2016 with an English Translation thereof.

* cited by examiner

Fig.6

| BASE STATION | CELL | KNOWN CELL INFORMATION | UNKNOWN CELL INFORMATION |
|---|---|---|---|
| 210a | 210a-1 | ... | × |
| 210a | 210a-2 | ... | × |
| 210a | 210a-3 | ... | × |
| 210b | 210b-1 | ... | × |
| 210b | 210b-2 | ... | × |
| 210b | 210b-3 | × | PCI、ECGI、TAC |
| 210c | 210c-2 | ... | × |
| ⋮ | ⋮ | ... | × |

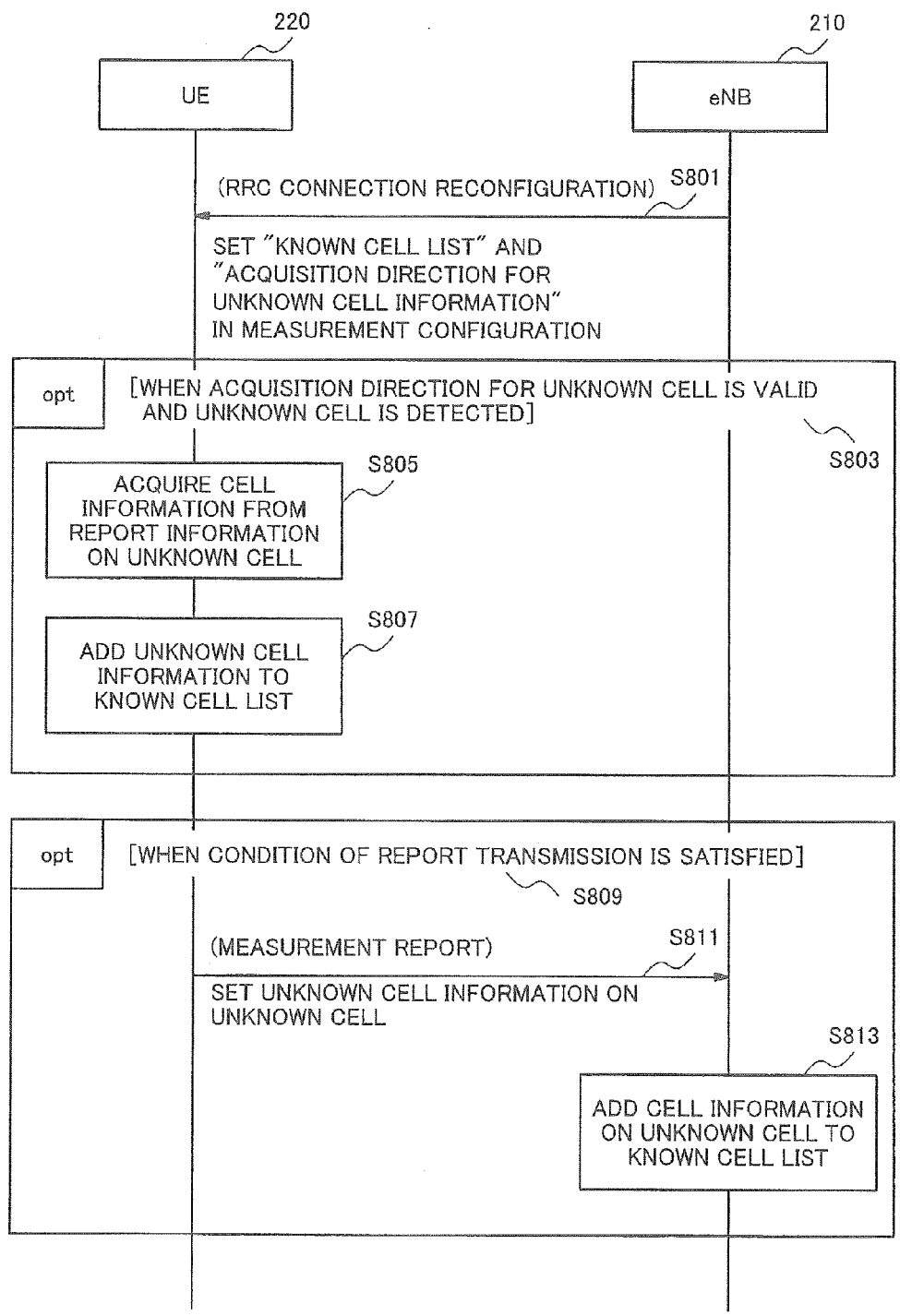

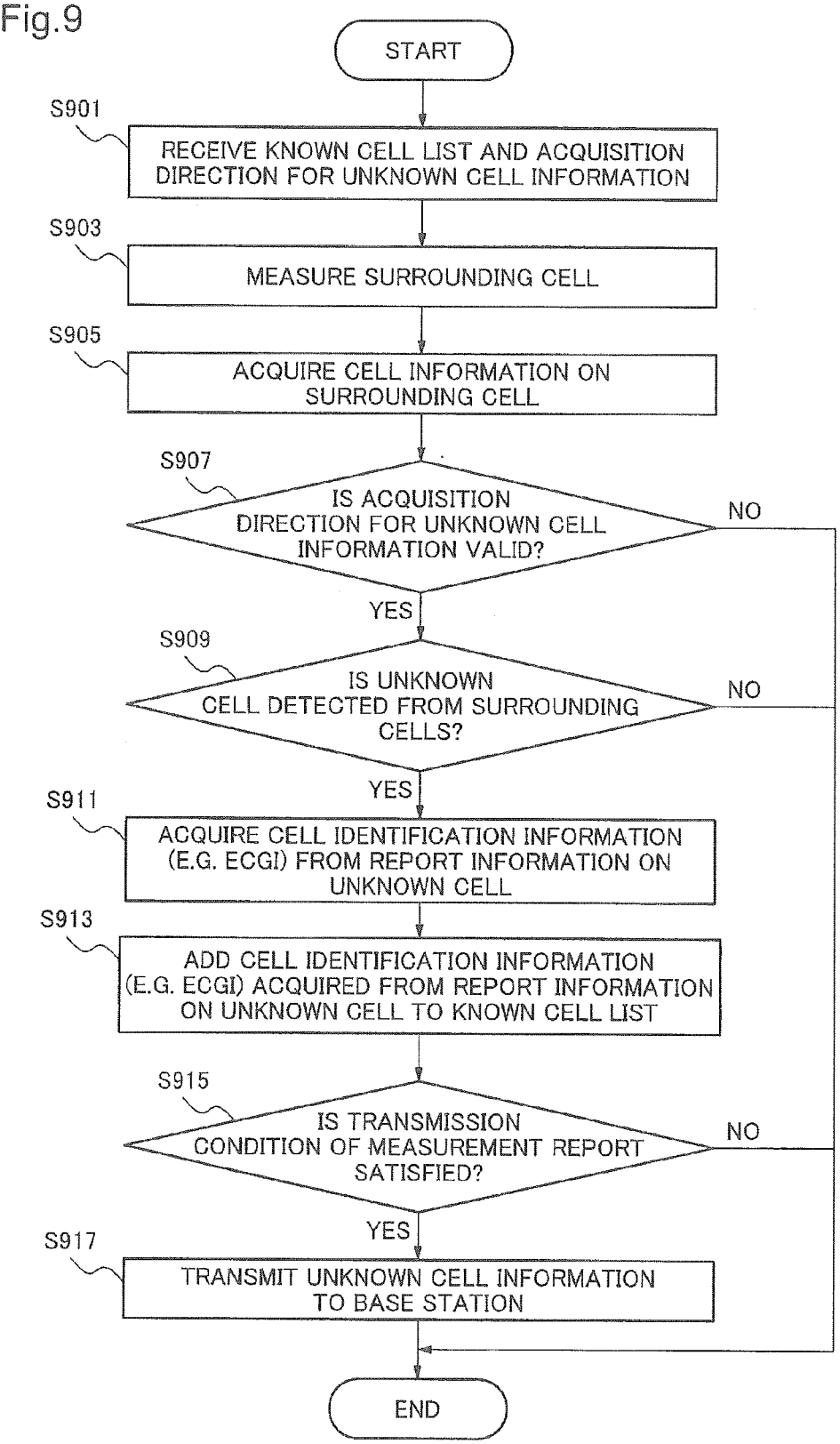

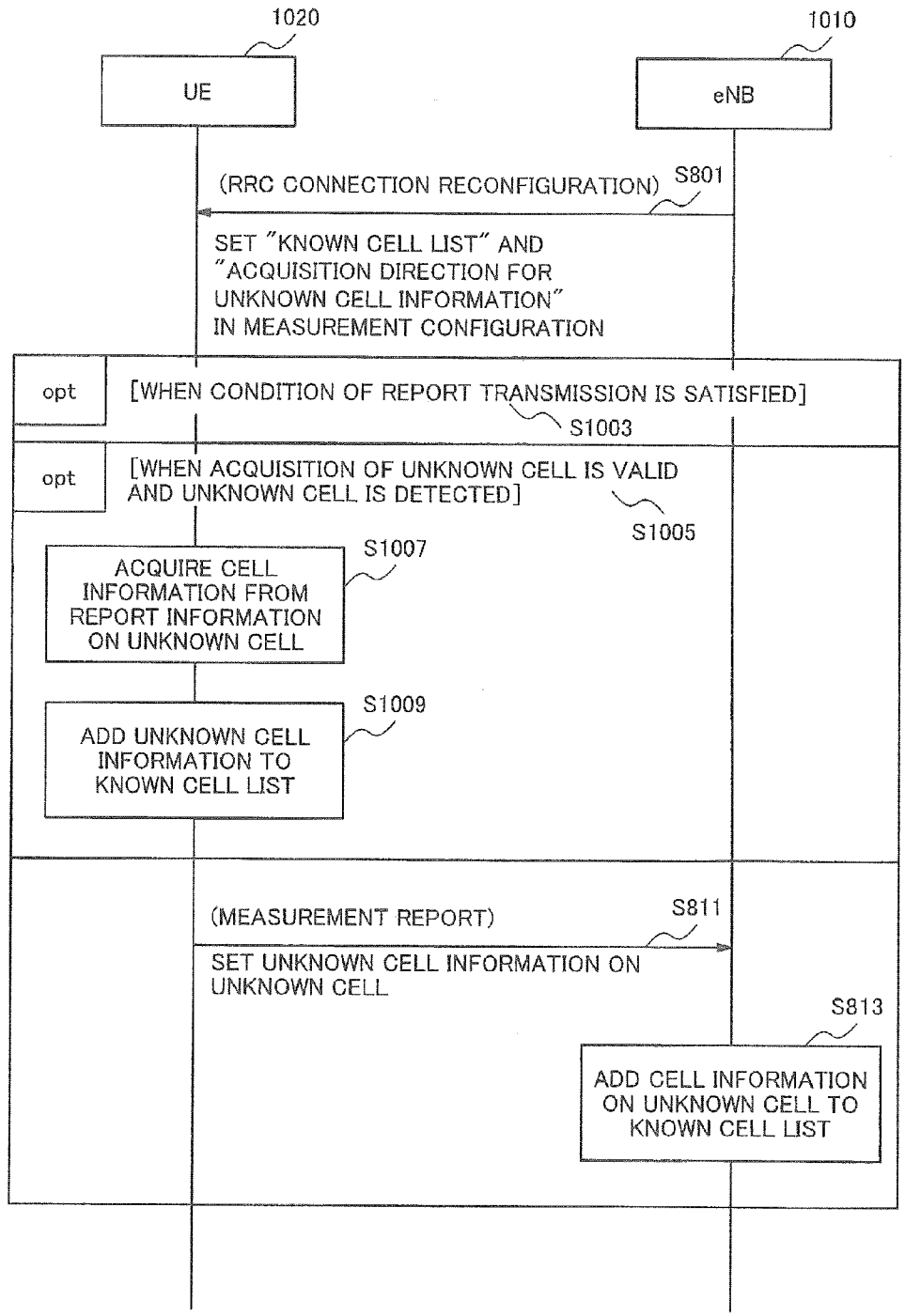

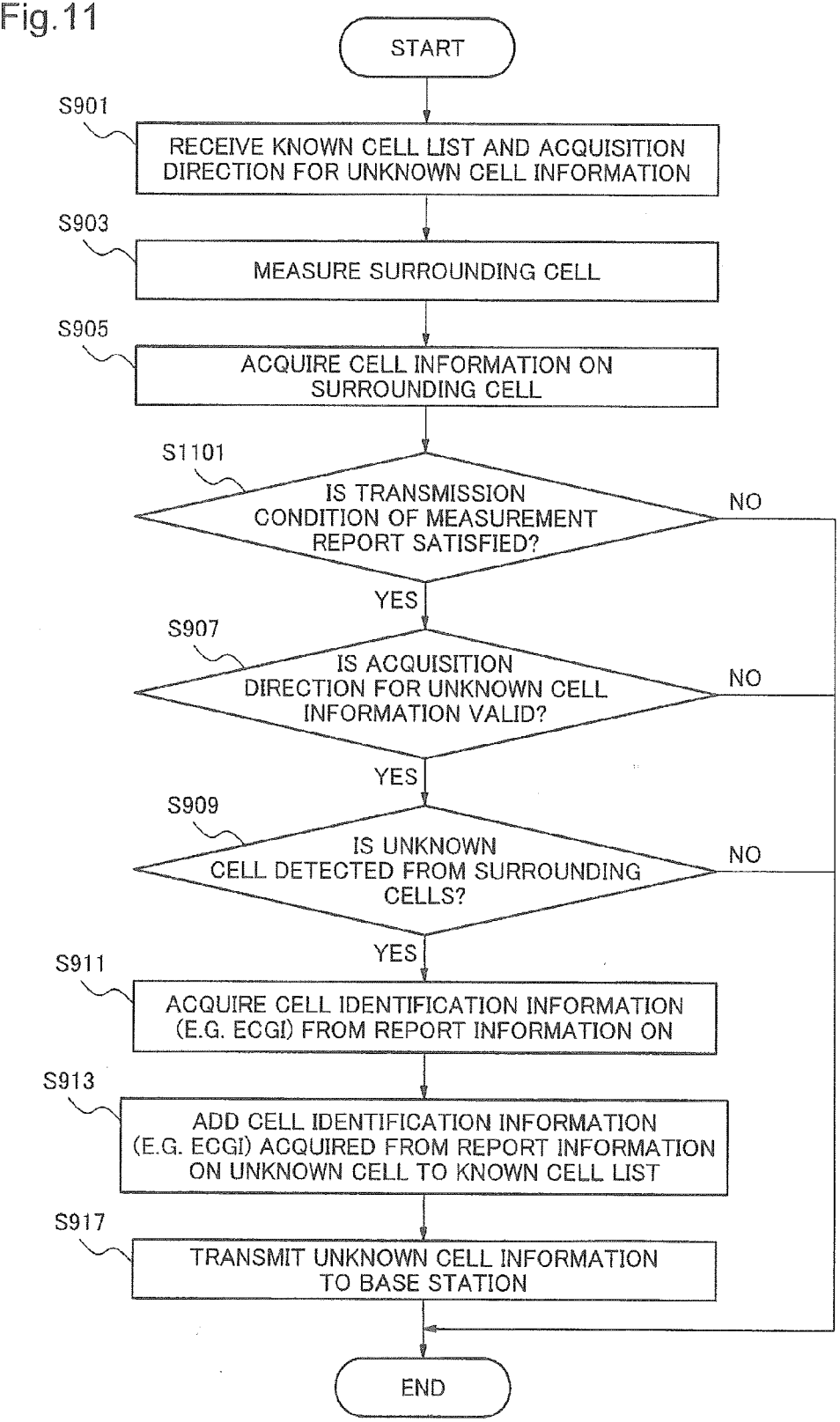

WIRELESS COMMUNICATION SYSTEM, WIRELESS COMMUNICATION METHOD, BASE STATION, MOBILE TERMINAL, METHOD FOR CONTROLLING BASE STATION, METHOD FOR CONTROLLING MOBILE TERMINAL, AND CONTROL PROGRAM FOR BASE STATION OR MOBILE TERMINAL

TECHNICAL FIELD

The present invention relates to a wireless communication technology.

BACKGROUND ART

In the technical field, as described in PTL (patent literature) 1, the technology is known, in which a base station instructs a mobile device to search a neighboring cell, and updates a stored adjacent cell list on the basis of the search result from the mobile device.
[PTL ]
[PTL1] Japanese Patent Application Laid-open 2008-219645

DISCLOSURE OF THE INVENTION

Problem to be Solved by the Invention

However, in the technology described in PTL1, the search result of which the mobile device informs the base station is merely the search result on a neighboring cell with which the mobile device can communicate. Therefore, since the base station acquires information on a neighboring cell whether the cell is an unknown cell or not, from the mobile device, inconvenience which the base station acquires a known cell which does not need to be acquired occurs.

An object of the invention is to provide a technology solving the problem described above.

Means For Solving The Problem

In order to solve the problem, a base station related to the present invention includes a cell information acquisition means for acquiring cell information including cell quality information and cell identification information on a surrounding cell located around the base station, a surrounding cell information storage means for storing known cell information on a known cell whose cell information is acquired in the cell information acquisition means, and a transmission means for transmitting, to a mobile terminal, the known cell information and acquisition direction for the cell information on a unknown cell that do not have the cell information corresponding to the known cell information.

In order to solve the problem, a mobile terminal related to the present invention includes a reception means for receiving known cell information and acquisition direction for unknown cell information on an unknown cell transmitted from a base station, a cell measurement means for measuring a surrounding cell located around the mobile terminal and acquiring cell information on the surrounding cell, on the basis of the acquisition direction, an unknown cell detection means for comparing the acquired cell information on the surrounding cell located around the mobile terminal with the known cell information received by the reception means, and detecting, as the unknown cell, the surrounding cell that do not have the cell information corresponding to the known cell information, and an unknown cell information transmission means for transmitting, to the base station, the cell information on the unknown cell detected by the unknown cell detection means.

In order to solve the problem, a method for controlling a base station in a wireless communication system including the base station and a mobile terminal related to the present invention, includes a cell information acquisition step of acquiring cell information including cell quality information and cell identification information on a surrounding cell located around the base station, and a transmission step of transmitting, to the mobile terminal, known cell information on a known cell whose cell information is acquired in the cell information acquisition step and acquisition direction for cell information on a unknown cell that do not have the cell information corresponding to the known cell information.

In order to solve the problem, a method for controlling a mobile terminal in a wireless communication system including a base station and the mobile terminal related to the present invention, includes a reception step of receiving known cell information and acquisition direction for unknown cell information on a unknown cell transmitted from the base station, a cell measurement step of measuring a surrounding cell located around the mobile terminal and acquiring cell information on the surrounding cell, on the basis of the acquisition direction, an unknown cell detection step of comparing the acquired cell information on the surrounding cell located around the mobile terminal with the known cell information received in the reception step, and detecting, as the unknown cell, the surrounding cell that do not have the cell information corresponding to the known cell information, and an unknown cell information transmission step of transmitting, to the base station, the cell information on the detected unknown cell.

In order to solve the problem, a control program for a base station in a wireless communication system comprising the base station and a mobile terminal related to the present invention, causes a computer to execute, a cell information acquisition step of acquiring cell information including cell quality information and cell identification information on a surrounding cell located around the base station, and a transmission step of transmitting, to the mobile terminal, known cell information on a known cell whose cell information is acquired in the cell information acquisition step, and acquisition direction for cell information on a unknown cell that do not have the cell information corresponding to the known cell information.

In order to solve the problem, a control program for a base station in a wireless communication system comprising a base station and the mobile terminal related to the present invention, causes a computer to execute, a reception step of receiving known cell information transmitted from the base station and acquisition direction for unknown cell information on a unknown cell, a cell measurement step of measuring a surrounding cell located around the mobile terminal and acquiring cell information on the surrounding cell, on the basis of the acquisition direction, an unknown cell detection step of comparing the acquired cell information on the surrounding cell located around the mobile terminal with the known cell information received in the reception step, and detecting, as the unknown cell, the surrounding cell that do not have the cell information corresponding to the known cell information, and an unknown cell information transmission step of transmitting, to the base station, the cell information on the detected unknown cell.

EFFECT OF THE INVENTION

According to the invention, a mobile terminal (UE: User Equipment) can measure surrounding cell information, select only cell information on an unknown cell detected from the surrounding cell information and inform the base station of the information of the unknown cell on the basis of a direction from the base station.

BRIEF DESCRIPTION ON DRAWINGS

Figure 2:
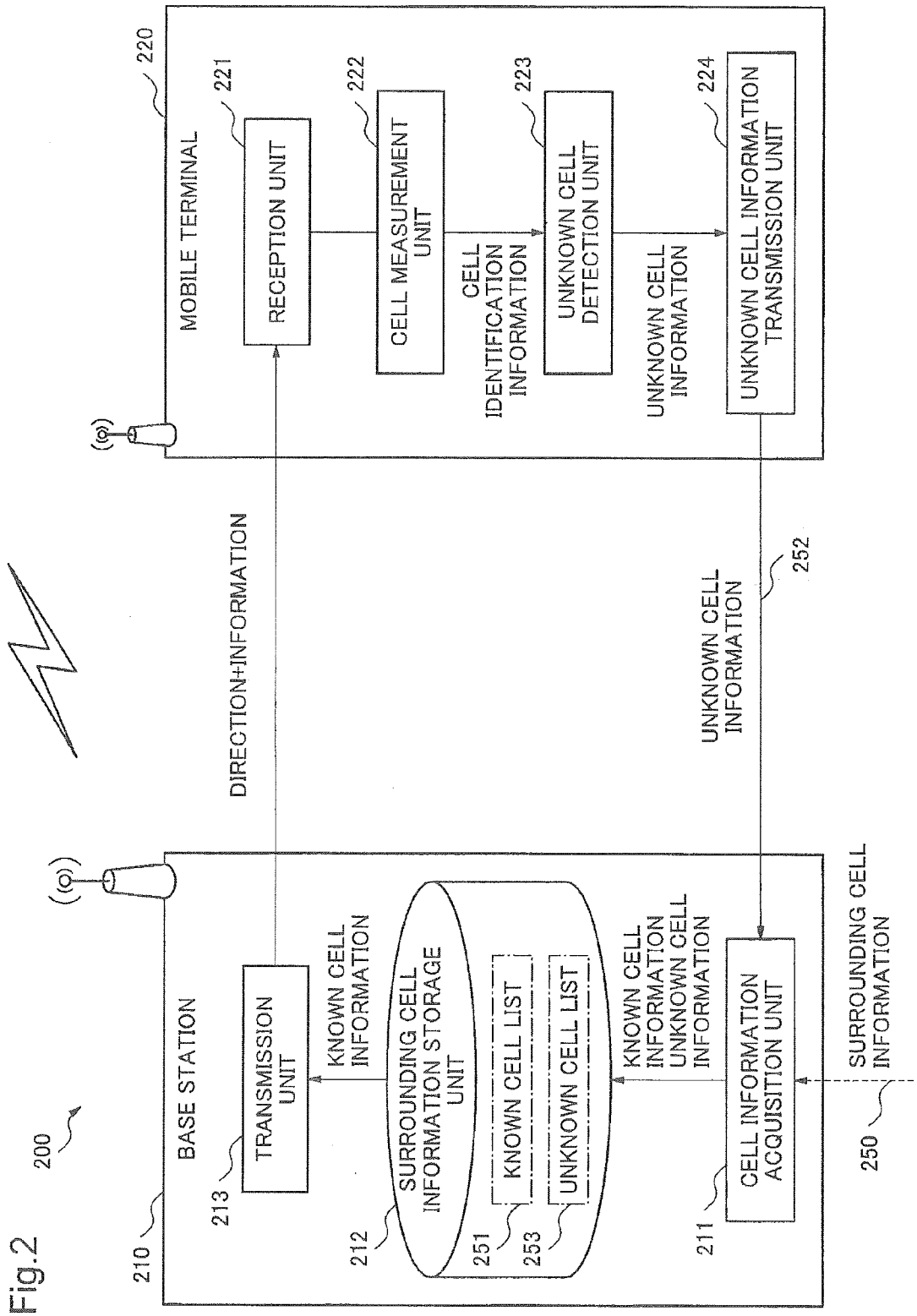
Figure 3:
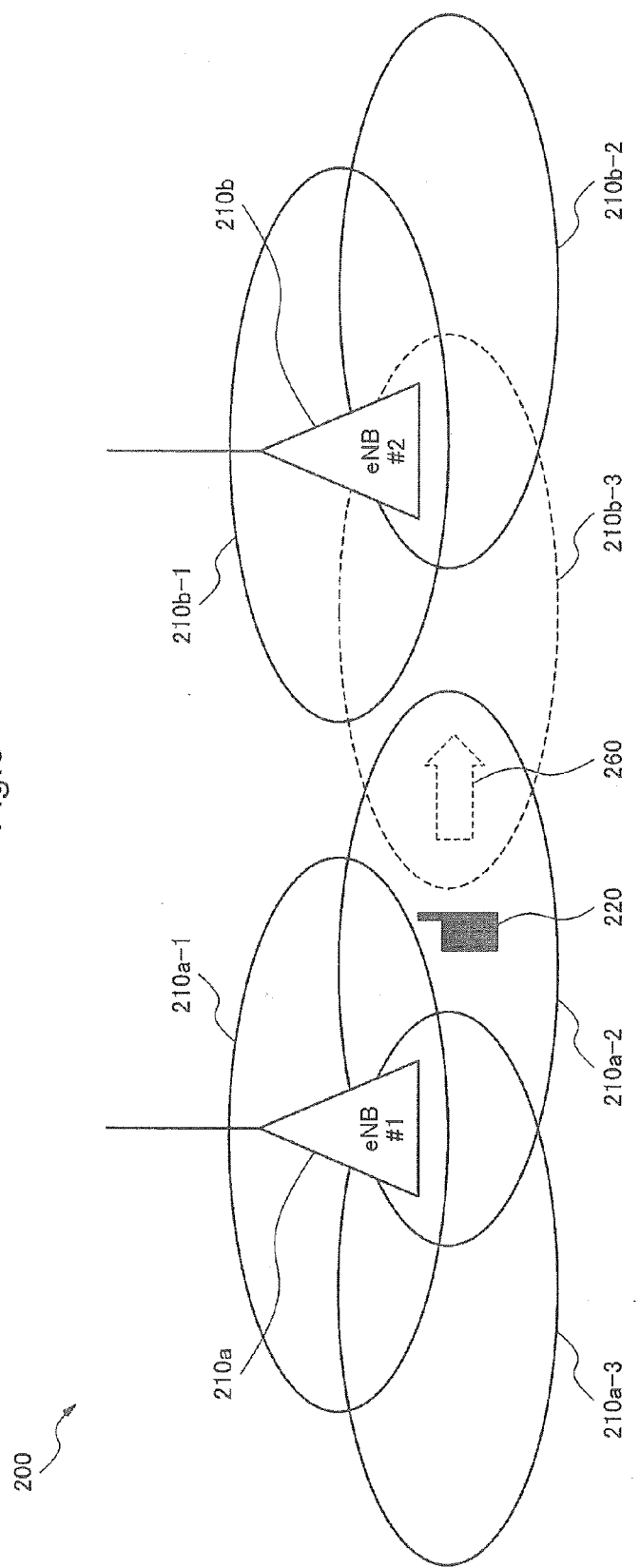
Figure 4:
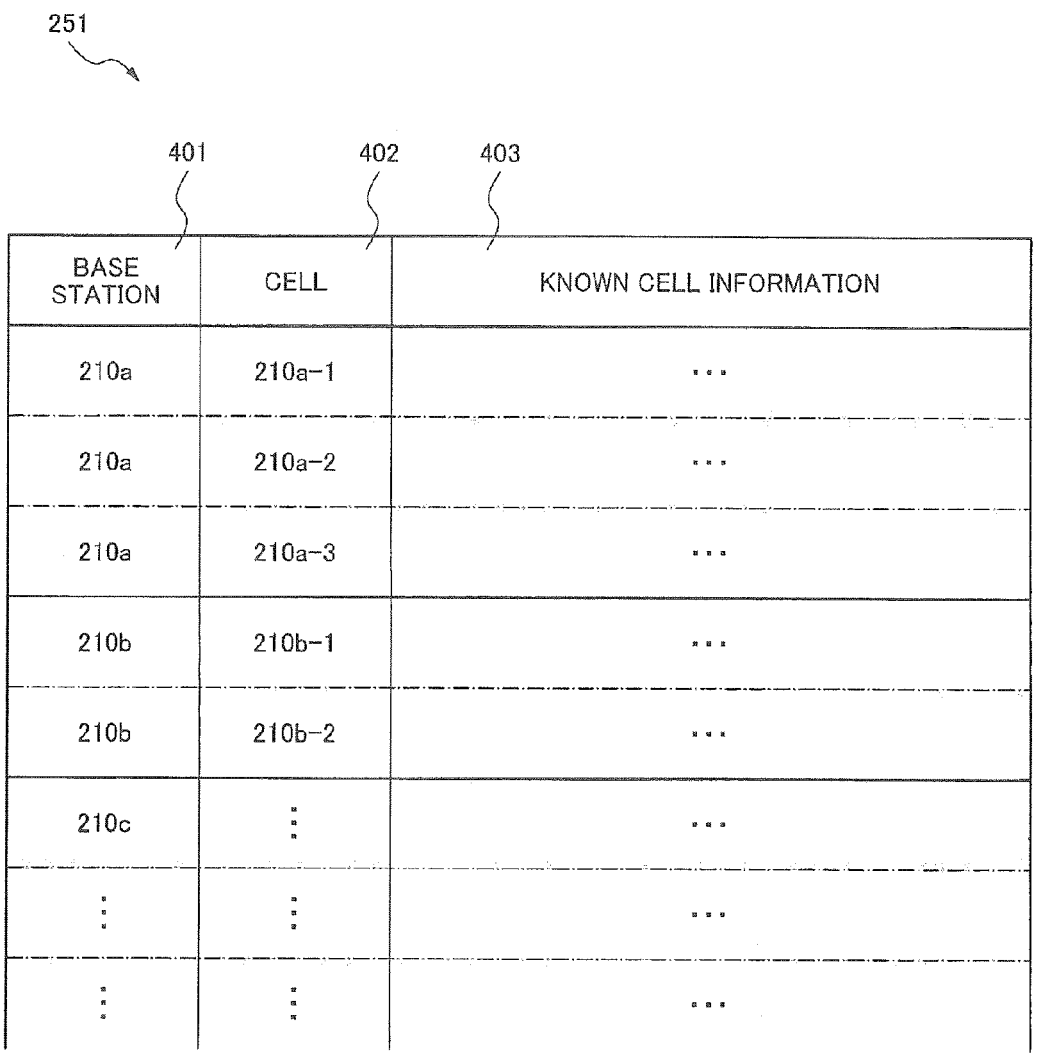
Figure 5:
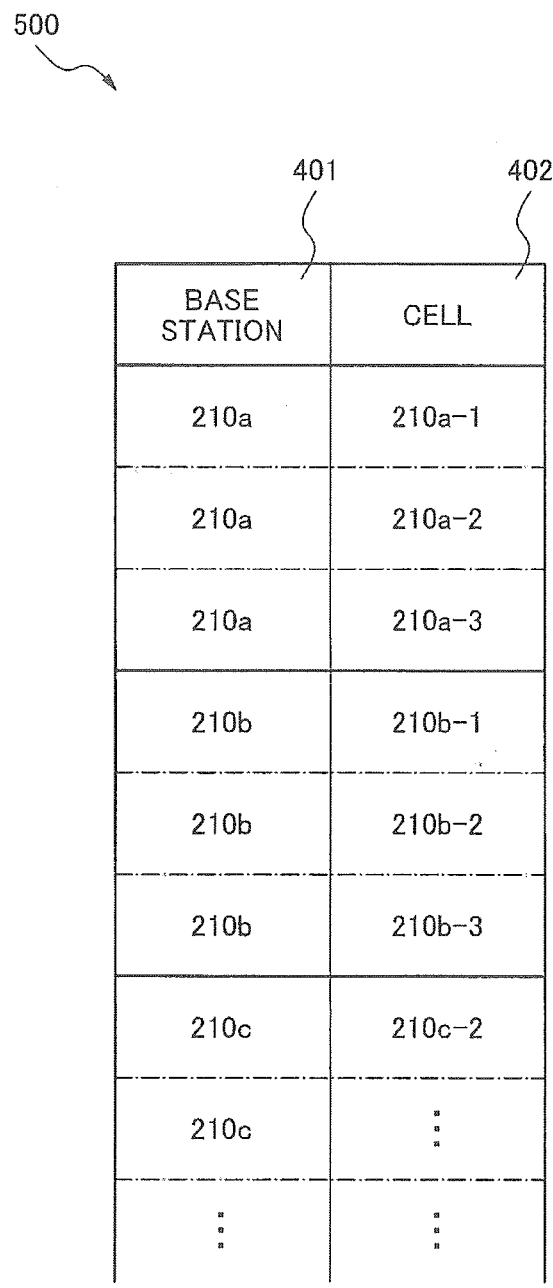
Figure 7:
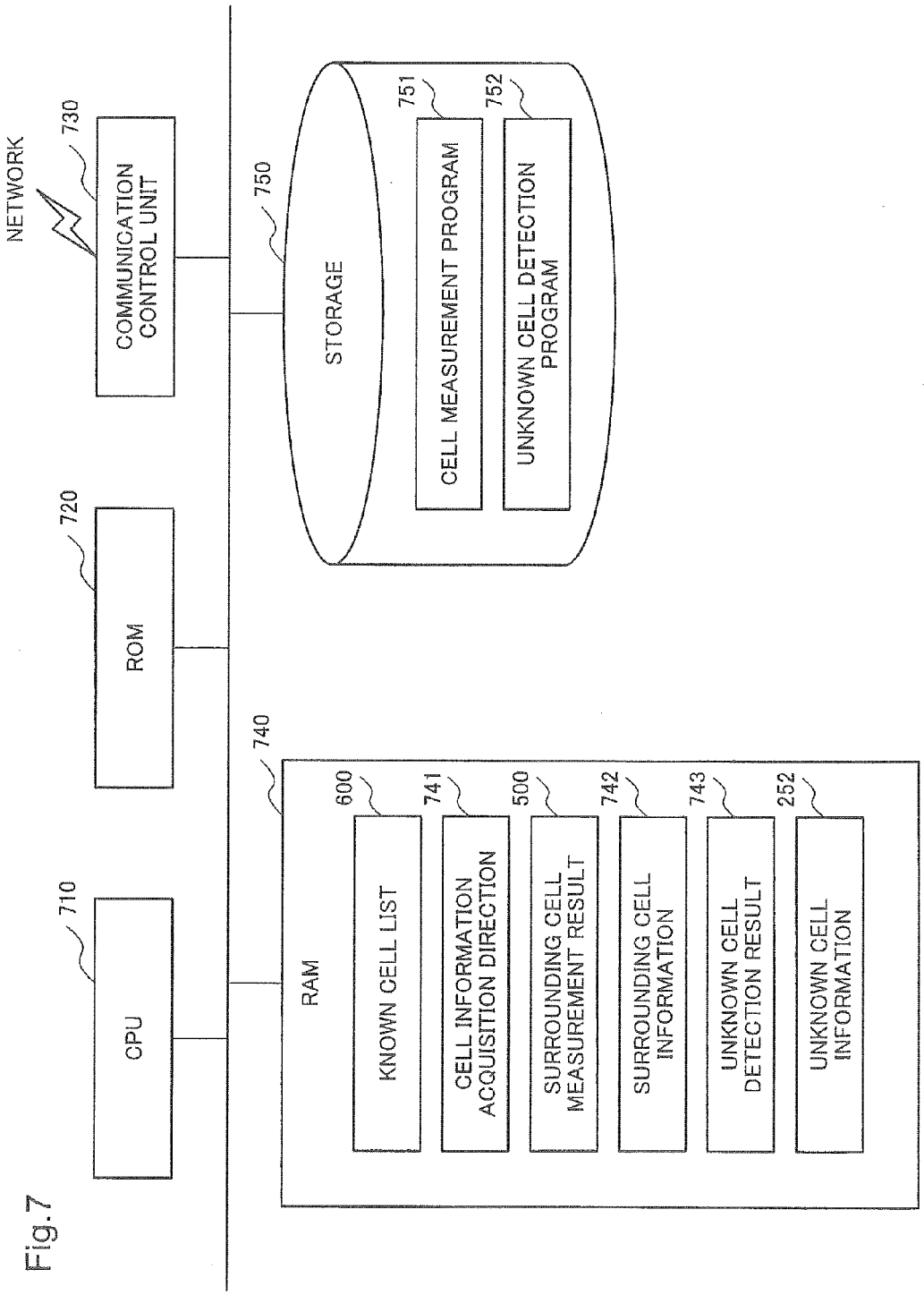

FIG. 1 A block diagram illustrating a configuration of a wireless communication system related to a first exemplary embodiment of the invention FIG. 2 A block diagram illustrating a configuration of a wireless communication system related to a second exemplary embodiment of the invention FIG. 3 A diagram illustrating a configuration of a wireless communication system related to the second exemplary embodiment of the invention FIG. 4 A diagram illustrating a known cell list of a base station in the second exemplary embodiment of the invention FIG. 5 A diagram illustrating a surrounding cell measurement result of a mobile terminal in the second exemplary embodiment of the invention FIG. 6 A diagram illustrating a known cell list of the mobile terminal in the second exemplary embodiment of the invention FIG. 7 A diagram illustrating a hardware configuration of the mobile terminal in the second exemplary embodiment of the invention FIG. 8 A sequence diagram illustrating procedures of the wireless communication system in the second exemplary embodiment of the invention FIG 9 A flowchart illustrating the procedures of the wireless communication system in the second exemplary embodiment of the invention FIG. 10 A sequence diagram illustrating procedures of a wireless communication system in a third exemplary embodiment of the invention FIG. 11 A flowchart illustrating the procedures of the wireless communication system in the third exemplary embodiment of the invention

BEST MODE FOR CARRYING OUT THE INVENTION

On the basis of drawings, exemplary embodiments of the invention are explained below exemplarily in detail. However, configulations, numerical values, flows of procedures, and functional elements which are described in following exemplary embodiments are only examples, and can be freely deformed and modified. The scope of the invention is not limited to following descriptions.

[First Exemplary Embodiment]

A wireless communication system 100 is explained as a first exemplary embodiment of the invention by using FIG. 1. The wireless communication system 100 is a system which achieves transmission of cell information from a mobile terminal to a base station.

As shown in FIG. 1, the wireless communication system 100 includes a base station 110 and a mobile terminal 120.

The base station 110 includes a cell information acquisition unit 111, a surrounding cell information storage unit 112, and a transmission unit 113.

The mobile terminal 120 includes a reception unit 121, a cell measurement unit 122, an unknown cell detection unit 123, and an unknown cell information transmission unit 124.

In the base station 110, the cell information acquisition unit 111 acquires cell information including cell quality information and cell identification information on a surrounding cell located around the base station. The surrounding cell information storage unit 112 stores known cell information on a known cell whose cell information is acquired by the cell information acquisition unit 111. The transmission unit 113 transmits, to the mobile terminal 120, the known cell information and an acquisition direction for unknown cell information including the cell quality information on a unknown cell that do not have cell information corresponding to the known cell information.

In the mobile terminal 120, the reception unit 121 receives the known cell information and the acquisition direction for the unknown cell information. The cell measurement unit 122 measures the surrounding cell located around the mobile terminal 120 on the basis of the acquisition direction and acquires the cell information on the surrounding cell. The unknown cell detection unit 123 compares the acquired cell information on the surrounding cell located around the mobile terminal 120 with the known cell information received by the reception unit 121, and detects, as the unknown cell, the surrounding cell that does not have the cell information corresponding to the known cell information. The unknown cell information transmission unit 124 transmits, to the base station 110, the cell information on the unknown cell detected by the unknown cell detection unit 123.

On the basis of the above configurations and the operations, according to the present exemplary embodiment, the mobile terminal can measure the surrounding cell information based on directions from the base station and inform the base station of only the cell information on the unknown cell detected from the surrounding cell information.

[Second Exemplary Embodiment]

A wireless communication system 200 of a second exemplary embodiment of the invention is explained by using FIG. 2. FIG. 2 is a block diagram explaining a configuration of the wireless communication system 200 of the exemplary embodiment.

As shown in FIG. 2, the configuration of the wireless communication system 200 includes a base station 210 and a mobile terminal 220. The base station 210 includes a cell information acquisition unit 211, a surrounding cell information storage unit 212, and a transmission unit 213. The surrounding cell information storage unit 212 stores the known cell list 251 and an unknown cell list 253. The mobile terminal 220 includes a reception unit 221, a cell measurement unit 222, an unknown cell detection unit 223, and an unknown cell information transmission unit 224. The unknown cell information transmission unit 224 transmits unknown cell information 252 to the base station 210.

In the base station 210, the cell information acquisition unit 211 acquires surrounding cell information 250 including cell identification information on a surrounding cell located around the base station 210, in advance. The surrounding cell information storage unit 212 generates the known cell list 251 on the basis of the known cell information acquired by the cell information acquisition unit 211, on a known cell which is a surrounding cell and whose cell information is acquired. The transmission unit 213 transmits, to the mobile terminal 220, the known cell list 251 received from the surrounding cell information storage unit 212. The transmission unit 213 transmits, to the mobile terminal 220, the acquisition direction for the unknown cell information, including cell quality information and cell identification information, on an unknown cell whose cell information corresponding to the known cell information stored in the surrounding cell information storage unit 212 is not included, in surrounding cells around the base station 210.

In the mobile terminal 220, the reception unit 221 receives the known cell list 251 transmitted from the transmission unit 213 and the acquisition direction for cell information. The cell measurement unit 222 measures a cell located around the mobile terminal 220 on the basis of the received acquisition direction for cell information and acquires cell information on the surrounding cell (cell identification information (PCI: Physical Cell Identity, and the like) and cell quality information). The unknown cell detection unit 223 compares the cell information on the surrounding cell acquired by the cell measurement unit 222 with the cell information of the known cell list 251 received by the reception unit 221. On the basis of the comparison result of the cell information, the unknown cell detection unit 223 detects, as an unknown cell, a surrounding cell that does not have cell information corresponding to the known cell information. Additionally, cell identification information on an unknown cell is acquired, as ECGI (Evolved Cell Global Identifier), or TAC (Tracking Area Code), by the cell measurement unit 222, from report information reported from the unknown cell.

The unknown cell information transmission unit 224 transmits, to the base station 210, the unknown cell information 252 including both cell identification information and cell quality information on the unknown cell acquired by the cell measurement unit 222. When receiving the unknown cell information 252, the cell information acquisition unit 211 in the base station 210 informs the surrounding cell information storage unit 212 thereof. When receiving the unknown cell information 252, the surrounding cell information storage unit 212 generates the unknown cell list 253.

FIG. 3 is a diagram illustrating a configuration of the wireless communication system 200 related to the present exemplary embodiment. As shown in FIG. 3, the wireless communication system 200 related to the present exemplary embodiment includes a base station (eNB#1) 210a, a base station (eNB#2) 210b, and a mobile terminal (UE) 220.

The base station 210a acquires, as the surrounding cell information 250, cell information on known cells 210a-1 to 210a-3 located around the base station 210a and cell information on known cells 210b-1 and 210b-2 at the cell information acquisition unit 211 therein. Additionally, the base station 210b acquires, as the surrounding cell information 250, cell information on known cells 210b-1 to 210b-3 located around the base station 210b and cell information on known cells 210a-1 to 210a-3 at the cell information acquisition unit 211 therein, just like the base station 210a.

When a call with the mobile terminal 220 is established, the base station 210a transmits acquisition direction for cell information on a surrounding cell of the mobile terminal 220 from the transmission unit 213 to the mobile terminal 220. At this time, the base station 210a transmits the known cell list 251 to the mobile terminal 220.

In the present exemplary embodiment, the mobile terminal 220 is located at the known cell 210a-2 and moves in the direction of an arrow 230. Cell information corresponding to the surrounding 210b-3 which is the destination of the mobile terminal 220 is not stored in the known cell list 251 transmitted from the base station 210a (refer to 402 in FIG. 4). Therefore, the base station 210a and the mobile terminal 220 do not recognize the surrounding 210b-3 as a known cell.

The cell measurement unit 222 in the mobile terminal 220 measures a surrounding cell located around the mobile terminal 220a. In the present exemplary embodiment, the cell measurement unit 222 measures surrounding cells 210a-1 to 210a-3, 210b-1 and 210b-3 (refer to FIG. 4). The unknown cell detection unit 223 compares cell information on these surrounding cells acquired by the cell measurement unit 222 with cell information on a known cell listed in the known cell list 251. Since the known cell list 251 does not list the surrounding cell 210b-3, the unknown cell detection unit 223 detects the surrounding cell 210b-3, as an unknown cell.

The unknown cell information transmission unit 224 stores unknown cell information on the unknown cell 210b-3 acquired by the unknown cell detection unit 223 in a Measurement Report for the base station 210a and transmits the Measurement Report. The Measurement Report is a message for reporting a measurement result on a surrounding cell.

(Transmission Condition on Measurement Report)

A condition in which the Measurement Report is transmitted from the mobile terminal 220 to the base station 210a is set according to the condition (Event A1 to A5, Event B1, B2) described in the chapter of 5.5.4 Measurement report triggering in 3GPP standard (TS36.331). Under the condition, unknown cell information is measured. In the present exemplary embodiment, as an example, following 1 or 2 is described.

1. A case in which event A3 (Inequality A3-1 (Entering condition)) is used at a trigger Type of reportConfigEUTRA The mobile terminal 220 can make setting in which Measurement Report is transmitted to the base station 210a, if the following condition (*1) is satisfied.

*1 [Measurement result on surrounding cell (RSRP/RSRQ)(Mn)+offsetFreq(Ofn) designated in measObjectEUTRA corresponding to a frequency of a corresponding surrounding cell+cellIndividualOffset(Ocn) designated in measObjectEUTRA corresponding to a frequency of a corresponding surrounding cell−hysteresi(Hys) designated in reportConfigEUTRA corresponding to a corresponding event]>[measurement result on a connecting cell (RSRP/RSRQ)(Mp)+offsetFreq(Ofp) designated in measObjectEUTRA corresponding to a frequency of a connecting cell+cellIndividualOffset(Ocp) designated in measObjectEUTRA corresponding to a frequency of a connecting cell+a3-Offset(Off) designated in reportConfigEUTRA corresponding to a corresponding event]

Above described symbols represents following contents.

Mn is a measurement result, of which offset is not considered, on a surrounding cell, Ofn is an offset frequency of each of the surrounding cell (i.e. offsetFreq is defined in the measObjectEUTRA corresponding to a frequency of the surrounding cell), Ocn is an offset of each of the surrounding cell (i.e. cellIndividualOffset is defined in measObjectEUTRA corresponding to a frequency of a surrounding cell), and Ocn is set to "0" when Ocn is not set for the surrounding cell, Mp is a measurement result of which offset is not considered, on a connecting cell, Ofp is an offset frequency of each of the surrounding cell (offsetFreq is defined in measObjectEUTRA corresponding to a frequency of a surrounding cell), Ocp is each offset of a connecting cell (i.e. cellIndividualOffset is defined in measObjectEUTRA corresponding to a frequency of a connecting cell), and Ocn is set to "0" when being not set for a connecting cell, Hys is a hysteresis parameter corresponding to the event (i.e. hysteresis is defined in reportConfigEUTRA corresponding to the event), Off is a offset parameter corresponding to the event (i.e. a3-Offset is defined in reportConfigEUTRA corresponding to the event).

2. A case in which eventA5 (Inequality A5-1 (Entering condition 1)) is used at a trigger Type of reportConfigEUTRA The mobile terminal 220 can make measurement setting in which Measurement Report is transmitted to the base station 210a, if the following condition (*2) is satisfied.

*2 [measurement result on a connecting cell (RSRP/RSRQ) (Mp)+hysteresis (Hys) designated in reportConfigEUTRA corresponding to a corresponding event]<[a5-Threshold1(Thresh1) designated in reportConfigEUTRA corresponding to a corresponding event], and [measurement result on a surrounding cell (RSRP/RSRQ)(Mn)+offsetFreq (Ofn) designated in measObjectEUTRA corresponding to a frequency of the corresponding surrounding cell+cellIndividualOffset(Ocn) designated in measObjectEUTRA corresponding to a frequency of the corresponding surrounding cell−hysteresis (Hys) designated in reportConfigEUTRA corresponding to the corresponding event]>[a5-Threshold2 (Thresh2) designated in reportConfigEUTRA corresponding to the corresponding event]

Above described symbols represents following contents.

Mp is a measurement result of which offset is not considered, on a connecting cell, Mn is a measurement result of which offset is not considered, on a surrounding cell, Ofn is an offset frequency of each of the surrounding cell (i.e. offsetFreq is defined in measObjectEUTRA corresponding to a frequency of a surrounding cell), Ocn is an offset of each of a surrounding cell (i.e. cellIndividualOffset is defined in measObjectEUTRA corresponding to a frequency of a surrounding cell), and Ocn is set to "0" when Ocn is not set for a surrounding cell, Hys is a hysteresis parameter corresponding to the event (i.e. hysteresis is defined in reportConfigEUTRA corresponding to the event), Thresh 1 is a threshold parameter corresponding to the event (i.e. a5-Threshold1 is defined in reportConfigEUTRA corresponding to the event), Thresh 2 is a threshold parameter corresponding to the event (i.e. a5-Threshold2 is defined in reportConfigEUTRA corresponding to the event), Incidentally, offsetFreq, hysteresis, and each offset/threshold are parameters and freely set within a predetermined range in the base station 210 (eNB).

The cell information acquisition unit 211 finally acquires unknown cell information on the unknown cell 210b-3 transmitted from the unknown cell information transmission unit 224 and then informs the surrounding cell information storage unit 212 as unknown cell information of the unknown cell information on the unknown cell 210b-3. The surrounding cell information storage unit 212 newly generates the unknown cell list 253 including the unknown cell information on the unknown cell 210b-3.

(Known Cell List of Base Station)

FIG. 4 is a diagram illustrating a known cell list 251 of the base station 210a in the exemplary embodiment. As shown in FIG. 4, the known cell list 251 stores information on a cell located around the base station 210a and includes a base station column 401, a cell column 402, and a known cell information column 403.

The base station column 401 shows each base station storing the surrounding cell located around the base station 210a. In the example, the base station 210a shows that information on the base station 210a, the base station 210b, and the base station 210c (not shown in FIG. 3) is acquired, as a base station which stores a known cell whose cell information is acquired from a surrounding cell.

The cell column 402 shows a cell whose cell information is acquired by the base station 210a from cells stored in the base stations 210a to 210c. In the example, the base station 210a shows that cell information on at least cells 210a-1 to 210a-3 is acquired. The base station 210a shows that cell information on the cell 210b-1 and the cell 210b-2 is acquired with respect to the base station 210b.

The known cell information column 403 shows cell information on a surrounding cell acquired by the cell information acquisition unit 211 of the base station 210a. The cell information is e.g. ECGI (Evolved Cell Global Identifier) or TAC (Tracking Area Code), but is not limited thereto.

(Surrounding Cell Measurement Result)

FIG. 5 is a diagram illustrating a surrounding cell measurement result 500 measured by the mobile terminal 220 of the exemplary embodiment.

The surrounding cell measurement result shows a surrounding cell which is located around the mobile terminal 220 and measured by the cell measurement unit 222 of the mobile terminal 220. The cell column 402 is a list of measured surrounding cells and the base station column 401 is a list of the base station which stores the measured surrounding cells. A cell not listed in the known cell list 251 (unknown cell) may be measured and listed. In this example, the cell 210b-3 is a cell which does not have cell information corresponding to known cell information listed in the known cell list 251 (FIG. 4) and is detected as an unknown cell by the unknown cell detection unit 223 of the mobile terminal 220.

Incidentally, following cases are supposed as situations in which a known cell is generated. A case is that lack of input occurred when cell information was manually set in a base station. Another case is that automatic updating was not performed in a system in which Self Configuration function (Automatic Neighbour Relation Function, and the like) with respect to PCI described in 3GPP standard TS36. 300 (V10.1.0) was installed.

(Known Cell List of Mobile Terminal)

FIG. 6 is a diagram illustrating a known cell list 600 of the mobile terminal 200 in the exemplary embodiment. As shown in FIG. 6, the known cell list 600 lists the base station column 401, the cell column 402, and the known cell information column 403, and an unknown cell information column 601, The cell measurement unit 222 acquires cell identification information (ECGI, TAC) reported from the measured cell 210b-3 and stores the cell identification information in the unknown cell information column 601. The unknown cell information column 601 includes cell identification information, e.g. PCI, ECGI, and TAC. As described above, the unknown cell detection unit 223 detects an unknown cell on the basis of unknown cell information included in a measurement result on a surrounding cell. The unknown cell information transmission unit 224 reports the unknown cell information 252 stored in the unknown cell information column 601 to the base station 210.

(Hardware Configuration)

FIG. 7 is a diagram illustrating a hardware configuration of the mobile terminal 220 in the exemplary embodiment. The mobile terminal 220 includes a CPU 710, a ROM 720, a communication control unit 730, a RAM 740, and a storage 750. The CPU 710 is a central processing unit, and controls a whole of the mobile terminal 220 by being executed by various programs. The ROM 720 is a read only memory, and stores a boot program to cause the CPU 710 to execute at first and various parameters. The RAM 740 is a random access memory. The RAM 740 includes the known cell list 600, cell information acquisition direction 741, the surrounding cell measurement result 500, surrounding cell information 742, an unknown cell detection result 743, and the unknown cell information 252. The storage 750 includes a cell measurement program 751 and an unknown cell detection program 752. The communication control unit 730 controls communication with the base station 210.

The known cell list 600 of the RAM 740 is the known cell list shown in FIG. 6. The known cell list 600 is a list in which the known cell list 251 of a surrounding cell of the base station 210 transmitted from the bases station is stored and modified in the mobile terminal 220. The cell information acquisition direction 741 is acquisition direction for cell information on a surrounding cell located around the mobile terminal 220, the acquisition direction being transmitted from the transmission unit 213. The surrounding cell measurement result 500 is a measurement result of a surrounding cell measured on the basis of information from the transmission unit 213 (refer to FIG. 5). The surrounding cell information 742 is cell identification information on a surrounding cell measured in the cell measurement unit 222. The unknown cell detection result 743 is a result of detecting an unknown cell which does not have cell information corresponding to the known cell list 600 from surrounding cells by the unknown cell detection unit 223. The unknown cell information 252 is information listed in the unknown cell information column 601 shown in FIG. 6 and unknown cell information including cell quality information on an unknown cell detected by the unknown cell detection unit 223.

Next, each program of the storage 750 is explained. The cell measurement program 751 measures the surrounding cell located around the mobile terminal 220 when cell information acquisition direction transmitted from the base station 210 is received in the reception unit 221. The unknown cell detection program 752 is a program for detecting a surrounding cell which does not have cell information corresponding to the known cell list 600 as an unknown cell from measured surrounding cells.

(Processing Procedure Between the Base Station and the Mobile Terminal)

FIG. 8 is a sequence diagram illustrating operation procedures between the base station (eNB) 210 and the mobile terminal (UE) 220 in the wireless communication system 200 of the exemplary embodiment.

In step S801, when transmitting RRC Connection Reconfiguration message is transmitted to the mobile terminal 220, the transmission unit 213 of the base station 210 sets the known cell list 251 and acquisition direction for unknown cell information in Measurement Configuration.

In step S803, the unknown cell detection unit 223 of the mobile terminal 220 confirms whether or not the acquisition direction for unknown cell information transmitted from the base station 210 is valid and further whether or not an unknown cell is detected. The decision that whether or not acquisition direction for unknown cell information transmitted from the base station 210 is valid, is determined on the basis of whether or not IE (Information element) which represents whether to transmit acquisition direction for unknown cell information is validly set in Measurement Configuration or not.

In step S805, the unknown cell detection unit 223 acquires the unknown cell information 252 from report information reported from a measured surrounding cell. In step S807, a storage unit (not shown) adds the acquired unknown cell information 252 to the known cell list 600 transmitted from the transmission unit 213 of the base station 210 and stored. The unknown cell information 252 includes cell identification information, e.g. PCI, ECGI, and TAC.

When a condition for transmitting Measurement Report to the base station 210 is established in step S809, the unknown cell information transmission unit 224 transmits Measurement Report to the base station 210 in step S811. The Measurement Report is set to include the unknown cell information 252 on an unknown cell detected from the measurement result on surrounding cells of the mobile terminal 220, and is transmitted to the base station 210. In step S813, the base station 210 stores the unknown cell information 252 received from the mobile terminal 220 in the unknown cell list 253 of the surrounding cell information storage unit 212.

FIG. 9 is a flowchart illustrating the operation procedures of the mobile terminal (UE) 220 in the wireless communication system 200 in the exemplary embodiment.

In step S901, the reception unit 221 receives the known cell list 251 and acquisition direction for the unknown cell information 252 from the base station 210. In step S903, the cell measurement unit 222 measures a surrounding cell located around the mobile terminal 220. In step S905, the cell measurement unit 222 acquires cell information on a surrounding cell of the mobile terminal 220. In step S907, the unknown cell detection unit 223 detects an unknown cell from the measurement result 500 on a surrounding cell. If the unknown cell is not detected, the unknown cell detection unit 223 ends operations and does not transmit Measurement Report.

On the other hand, if the unknown cell is detected, the unknown cell detection unit 223 confirms whether or not acquisition direction for the unknown cell information 252 is valid in the setting of Measurement Configuration from the base station 210 in step S909, and proceeds to step S911 if the acquisition direction is valid. In step S911, the unknown cell detection unit 223 acquires the unknown cell information 252 reported from an unknown cell (cell identification information: ECGI, TAC, and the like).

In step S913, the storage unit (not shown) stores the acquired unknown cell information 252 (cell identification information: ECGI, TAC, and the like) in the known cell list 600. If the transmission condition of Measurement Report is satisfied in step S915, the unknown cell information transmission unit 224 transmits the unknown cell information 252 to the cell information acquisition unit 211 of the base station 210 in step S917.

In configurations and operations above described, according to the exemplary embodiment, the mobile terminal can detect the surrounding cell information on the basis of direction from the base station, and select only cell information on an unknown cell from the detected surrounding cell information and inform the base station thereof.

[Third Exemplary Embodiment]

A wireless communication system 300 of a third exemplary embodiment of the invention is explained by using FIG. 10. FIG. 10 is a sequence diagram illustrating operation procedures of a base station (eNB) 1010 and a mobile terminal 1020 in the wireless communication system 300 in the exemplary embodiment.

The wireless communication system 300 of the exemplary embodiment differs from the second exemplary embodiment in the timing of acquiring cell identification information (ECGI, TAC, or the like) on an unknown cell reported from the unknown cell. The timing of acquiring cell identification information (ECGI, TAC, or the like) in this exemplary embodiment is the timing of transmitting Measurement Report to the base station, and the timing of acquiring cell identification information in the second exemplary embodiment is the timing of detecting an unknown cell.

It is the same as the second exemplary embodiment that RRC Connection Reconfiguration message is transmitted from the base station 1010 to the mobile terminal 1020 in step S801.

In step S1003, the unknown cell detection unit confirms whether or not a condition for transmitting Measurement Report to the base station 1010 is established. In step S1005, the unknown cell detection unit confirms whether or not acquisition direction for unknown cell information transmitted from the base station 1010 is valid and further whether an unknown cell is detected in surrounding cells measured in the unknown cell detection unit.

In step S1007, with respect to an unknown cell in the measured surrounding cells, the unknown cell detection unit acquires the unknown cell information 252 from report information from the unknown cell. In step S1009, a storage unit adds the acquired unknown cell information to the known cell list 600 transmitted from the transmission unit of the base station 1010 and stored.

Since it is confirmed that a transmission condition of Measurement Report is already satisfied in step S1003, the unknown cell information transmission unit transmits, to the base station 1010, Measurement Report in which the unknown cell information is set, in step S811. In step S813, the base station 1010 stores the unknown cell information received from the mobile terminal 1020 in the unknown cell list of the known cell list.

Incidentally, in this exemplary embodiment, in order to avoid handover failure due to delay of Measurement Report transmission, it is preferable to set a threshold for a report condition of Measurement Report lower than the threshold for the report condition of the second exemplary embodiment. Thereby, it is possible to prevent transmission of Measurement Report from being performed at the timing just before handover. The setting may be performed by IE.

FIG. 11 is a flowchart illustrating the operation procedures of the mobile terminal 1020 in the exemplary embodiment. Steps S901 to S905 are the same as the operation procedures of the second exemplary embodiment. When a surrounding cell is measured, the unknown cell detection unit confirms whether or not the transmission condition of Measurement Report is satisfied in step S1101, and step S907 is carried out if the transmission condition is satisfied. In the exemplary embodiment, the transmission condition of Measurement Report is confirmed before validity of acquisition direction for unknown cell information from the base station is confirmed in step S907 and before an unknown cell is detected. Thereby, the unknown cell information transmission unit can transmit the unknown cell information to the base station just after the unknown cell information is acquired.

Since steps S907 to S913, and step S917 are the same as the second exemplary embodiment, the explanation thereof is omitted.

In configurations and operations described above, according to the exemplary embodiment, it is possible to carry out processing of cell information acquisition with respect to only cell which can become necessary at the time of handover of a mobile terminal.

[Fourth Exemplary Embodiment]

A wireless communication system 1200 of a fourth exemplary embodiment of the invention is explained. The wireless communication system 1200 of the exemplary embodiment differs from the second exemplary embodiment in that call of unknown cell information acquisition is limited.

The wireless communication system 1200 of the exemplary embodiment may be applied only to an emergency call. In the exemplary embodiment, since the base station needs to manage or inform of surrounding cell information for a mobile terminal on which a call is established regarding a call which is a target of acquiring the unknown cell information, the base station limits the call which is a target of acquiring the unknown cell information. It is always possible to limit a call, it is possible to carry out the limitation according to the predetermined timing and setting of the limitation can be changed if necessary.

In configurations and operations above described, according to the exemplary embodiment, it is possible to reduce burden of management or informing for surrounding cell information to be reported for each mobile terminal by limiting a mobile terminal which is a target of acquiring unknown cell information.

[Fifth Exemplary Embodiment]

Next, a system of a fifth exemplary embodiment of the invention is explained.

The system of the fifth exemplary embodiment of the invention is a wireless communication system including a base station and a mobile terminal, in which the base station includes cell information acquisition means for acquiring cell information including cell quality information and cell identification information on a surrounding cell located around the base station, surrounding cell information storage means for storing known cell information on a known cell whose cell information is acquired by the cell information acquisition means, and transmission means for transmitting, to a mobile terminal, the known cell information and acquisition direction for the cell information on an unknown cell that does not have the cell information corresponding to the known cell information, and the mobile terminal includes reception means for receiving the known cell information and the acquisition direction for unknown cell information on the unknown cell transmitted from the base station, cell measurement means for measuring a surrounding cell located around the mobile terminal on the basis of the acquisition direction and acquiring cell information on the surrounding cell, unknown cell detection means for comparing the acquired cell information on the surrounding cell located around the mobile terminal with the known cell information received by the reception means and detecting, as the unknown cell, the surrounding cell that does not have the cell information corresponding to the known cell information, and unknown cell information transmission means for transmitting, to the base station, the cell information on the unknown cell detected by the unknown cell detection means.

[Sixth Exemplary Embodiment]

Next, a method of a sixth exemplary embodiment of the invention is explained.

The method of the sixth exemplary embodiment of the invention is a wireless communication method of a wireless communication system including a base station and a mobile terminal, which includes a cell information acquisition step in which the base station acquires cell information including cell quality information and cell identification information on a surrounding cell located around the base station, a transmission step in which the base station transmits, to the mobile terminal, known cell information on a known cell whose cell information is acquired in the cell information acquisition step and acquisition direction for cell information on an unknown cell that do not have the cell information corresponding to the known cell information, a reception step in which the mobile terminal receives the known cell information and acquisition direction for unknown cell information on the unknown cell, a cell measurement step in which the mobile terminal measures the surrounding cell located around the mobile terminal on the basis of the acquisition direction, and acquiring cell information on the surrounding cell, an unknown cell detection step in which the mobile terminal compares the acquired cell information on the surrounding cell located around the mobile terminal with the known cell information received by the reception means and detecting, as the unknown cell, the surrounding cell that do not have the cell information corresponding to the known cell information, and an unknown cell information transmission step in which the mobile terminal transmits, to the base station, the cell information on the detected unknown cell.

[Other Exemplary Embodiments]

Though the exemplary embodiments of the invention are described in detail, a system or device in which the different features included in the exemplary embodiments are combined in any manner is included in the scope of the invention.

The invention may be applied to a system composed of a plurality of devices and to a single device. The invention is applicable when an information processing program which achieves functions of the exemplary embodiments is supplied from a remote place to a system or a device, or directly supplied thereto. Therefore, a program which installed in a computer in order to cause the computer to execute the functions of the invention, a medium storing the program, and a WWW (World Wide Web) server causing the program to be downloaded are included in the scope of the invention.

While having described an invention of the present application referring to the embodiments, the invention of the present application is not limited to the above mentioned embodiments. It is to be understood that to the configurations and details of the invention of the present application, various changes can be made within the scope of the invention of the present application by those skilled in the art.

This application claims priority from Japanese Patent Application No. 2011-174572 filed on Aug. 10, 2011, the contents of which are incorporation herein by reference in their entirety.

[Other Descriptions on Exemplary Embodiments]

A part or all of the exemplary embodiments may be described as following supplementary notes, however is not limited thereto.

(Supplementary Note 1)

A wireless communication system including a base station and a mobile terminal, wherein the base station includes:

cell information acquisition means for acquiring cell information including cell quality information and cell identification information on a surrounding cell located around the base station;

surrounding cell information storage means for storing known cell information on a known cell whose cell information is acquired by the cell information acquisition means; and transmission means for transmitting, to the mobile terminal, the known cell information and acquisition direction for the cell information on an unknown cell that do not have the cell information corresponding to the known cell information, the mobile terminal includes:

reception means for receiving the known cell information and the acquisition direction for the unknown cell information on the unknown cell transmitted from the transmission means;

cell measurement means for measuring the surrounding cell located around the mobile terminal on the basis of the acquisition direction, and acquiring the cell information on the surrounding cell, unknown cell detection means for comparing the acquired cell information on the surrounding cell located around the mobile terminal with the known cell information received by the reception means, and detecting, as the unknown cell, the surrounding cell that do not have the cell information corresponding to the known cell information, and unknown cell information transmission means for transmitting, to the base station, the cell information on the unknown cell detected by the unknown cell detection means.

(Supplementary Note 2)

The wireless communication system of the supplementary note 1, wherein the transmission means directs to acquire the unknown cell information at predetermined timing.

(Supplementary Note 3)

The wireless communication system of the supplementary notes 1 or the supplementary note 2, wherein the mobile terminal further includes storage means for storing the unknown cell information acquired by the unknown cell detection means.

(Supplementary Note 4)

A wireless communication method in a wireless communication system including a base station and a mobile terminal, the wireless communication method includes:

a cell information acquisition step in which the base station acquires cell information including cell quality information and cell identification information on a surrounding cell located around the base station;

a transmission step in which the base station transmits, to the mobile terminal, known cell information on a known cell whose cell information is acquired in the cell information acquisition step, and acquisition direction for cell information on an unknown cell that do not have the cell information corresponding to the known cell information;

a reception step in which the mobile terminal receives the known cell information and the acquisition direction for unknown cell information on the unknown cell;

a cell measurement step in which the mobile terminal measures the surrounding cell located around the mobile terminal on the basis of the acquisition direction, and acquiring cell information on the surrounding cell;

an unknown cell detection step in which the mobile terminal compares the cell information on the surrounding cell with the known cell information received in the reception step, and detecting, as the unknown cell, the surrounding cell that do not have the cell information corresponding to the known cell information; and an unknown cell information transmission step in which the mobile terminal transmits, to the base station, the cell information on the detected unknown cell.

(Supplementary Note 5)

A base station including:

cell information acquisition means for acquiring cell information including cell quality information and cell identification information on a surrounding cell located around the base station;

surrounding cell information storage means for storing known cell information on a known cell whose cell information is acquired by the cell information acquisition means; and transmission means for transmitting, to a mobile terminal, the known cell information and acquisition direction for cell information on an unknown cell that do not have cell information corresponding to the known cell information.

(Supplementary Note 6)

A mobile terminal including:

reception means for receiving known cell information and acquisition direction for unknown cell information on a unknown cell transmitted from a base station;

cell measurement means for measuring a surrounding cell located around the mobile terminal on the basis of the acquisition direction, and acquiring cell information on the surrounding cell;

unknown cell detection means for comparing the acquired cell information on the surrounding cell located around the mobile terminal with the known cell information received by the reception means, and detecting, as the unknown cell, the surrounding cell that do not have the cell information corresponding to the known cell information; and unknown cell information transmission means for transmitting, to the base station, the cell information on the unknown cell detected by the unknown cell detection means.

(Supplementary Note 7)

A method for controlling a base station in a wireless communication system including the base station and a mobile terminal, including:

a cell information acquisition step of acquiring cell information including cell quality information and cell identification information on a surrounding cell located around the base station; and a transmission step of transmitting, to the mobile terminal, known cell information on a known cell whose cell information is acquired in the cell information acquisition step, and acquisition direction for cell information on an unknown cell that do not have the cell information corresponding to the known cell information.

(Supplementary Note 8)

A method for controlling a mobile terminal in a wireless communication system including a base station and the mobile terminal, including:

a reception step of receiving known cell information and acquisition direction for unknown cell information on an unknown cell transmitted from the base station;

a cell measurement step of measuring a surrounding cell located around the mobile terminal on the basis of the acquisition direction, and acquiring cell information on the surrounding cell;

an unknown cell detection step of comparing the acquired cell information on the surrounding cell located around the mobile terminal with the known cell information received in the reception step, and detecting, as the unknown cell, the surrounding cell that do not have the cell information corresponding to the known cell information; and an unknown cell information transmission step of transmitting, to the base station, cell information on the detected unknown cell.

(Supplementary Note 9)

A control program for a base station in a wireless communication system including the base station and a mobile terminal, the control program causes a computer to execute:

a cell information acquisition step of acquiring cell information including cell quality information and cell identification information on a surrounding cell located around the base station; and a transmission step of transmitting, to the mobile terminal, known cell information on a known cell whose cell information is acquired in the cell information acquisition step and acquisition direction for cell information on a unknown cell that do not have cell information corresponding to the known cell information.

(Supplementary Note 10)

A control program for a mobile terminal in a wireless communication system including a base station and the mobile terminal, the control program causes a computer to execute, a reception step of receiving known cell information and acquisition direction for unknown cell information on an unknown cell transmitted from the base station, a cell measurement step of measuring a surrounding cell located around the mobile terminal on the basis of the acquisition direction, and acquiring cell information on the surrounding cell, an unknown cell detection step of comparing the acquired cell information on the surrounding cell located around the mobile terminal with the known cell information received in the reception step, and detecting, as the unknown cell, the surrounding cell that do not have cell information corresponding to the known cell information, and an unknown cell information transmission step of transmitting, to the base station, the cell information on the detected unknown cell.

The invention claimed is:

1. A wireless communication system, comprising:
a base station; and
a mobile terminal,
wherein the base station comprises:
a non-transitory computer readable medium executable by a computer including a program for:
acquiring known cell information including cell quality information and Evolved Cell Global Identifier (ECGI) of a surrounding cells located around the base station; and
transmitting, to a mobile terminal, the known cell information and acquisition direction for acquiring the ECGI of an unknown cell, the unknown cell having information corresponding to the known cell information, the acquisition direction further requiring the mobile terminal to transmit the ECGI of the unknown cell to the base station acquired by the mobile terminal, wherein the mobile terminal comprises:
   a processor; and
   a non-transitory computer readable medium executable by the processor, including a program for:
   receiving known cell information and acquisition direction for unknown cell information on an unknown cell transmitted from a base station;
   measuring a surrounding cell located around the mobile terminal on the basis of the acquisition direction, and acquires cell information on the surrounding cell;
   comparing the acquired cell information on the surrounding cell located around the mobile terminal with the known cell information received by the receiving step, and detecting, as the unknown cell, the surrounding cell that do not have the cell information corresponding to the known cell information; and
   transmitting, to the base station, the cell information on the unknown cell detected by the comparing and detecting step,
wherein the transmitting step of the base station further includes transmitting, to the mobile terminal, the acquisition direction for the unknown cell, including cell quality information and cell identification information, on the unknown cell whose cell information corresponding to the known cell information stored in the non-transitory storage medium is not included, in surrounding cells around the base station, and
wherein the comparing and detecting step of the mobile terminal confirms whether or not the acquisition direction for the unknown cell information transmitted from the base station is valid and further whether or not the unknown cell is detected, the decision that whether or not acquisition direction for the unknown cell information transmitted from the base station is valid, is determined on a basis of whether or not an information element which represents whether to transmit acquisition direction for unknown cell information is validly set in a measurement configuration or not.

2. The wireless communication system of claim 1, wherein the transmitting further comprising directing to acquire the unknown cell information at predetermined timing.

3. The wireless communication system of claim 1, wherein the the non-transitory computer readable medium of the mobile terminal stores the unknown cell information acquired by the comparing and detecting step.

4. The wireless communication system according to claim 1,
   wherein the acquiring step of the base station is configured to acquire cell information including cell quality information and Evolved Cell Global Identifier (ECGI) of the surrounding cell located around the base station, and
   wherein the transmitting step of the base station includes a transmitter that is configured to transmit to the mobile terminal, known cell information and acquisition direction for the ECGI of the unknown cell that do not have the cell information corresponding to the known cell information.

* * * * *